Aug. 31, 1965     M. CAREJE     3,203,072
MILLING CUTTERS
Filed Jan. 29, 1965     3 Sheets-Sheet 1
*Fig. 2*
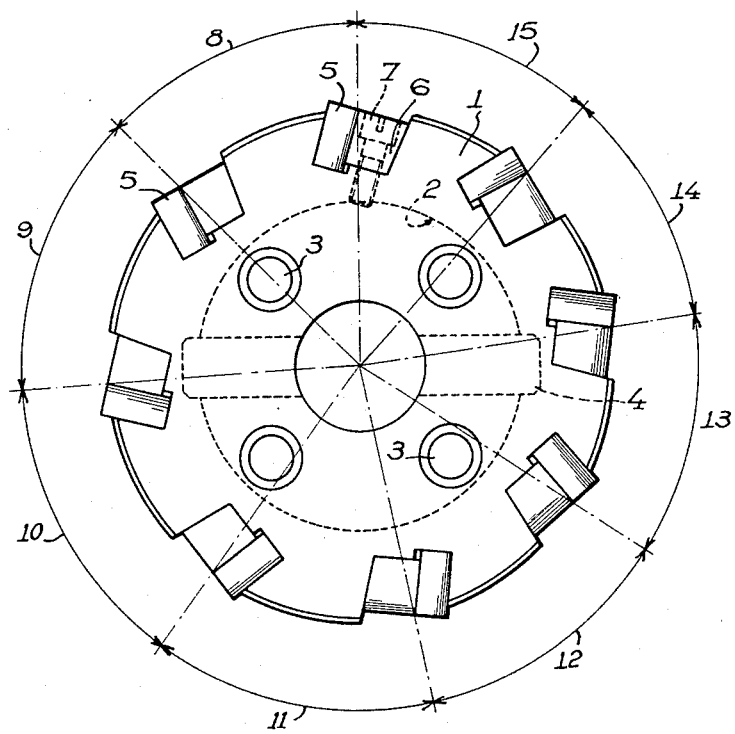
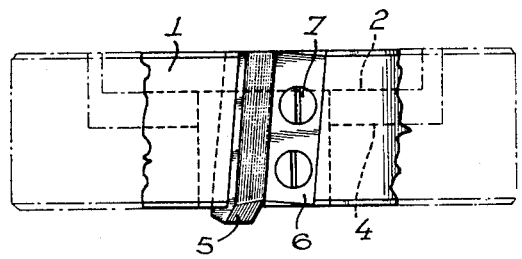
*Fig. 1*
INVENTOR
MICHEL CAREJE
BY Corey, Hart + Stemple
ATTORNEYS Aug. 31, 1965   M. CAREJE   3,203,072
MILLING CUTTERS
Filed Jan. 29, 1965   3 Sheets-Sheet 2

INVENTOR
MICHEL CAREJE
BY
Corey, Hart + Stemple
ATTORNEYS

Aug. 31, 1965   M. CAREJE   3,203,072
MILLING CUTTERS
Filed Jan. 29, 1965   3 Sheets-Sheet 3
Fig. 5
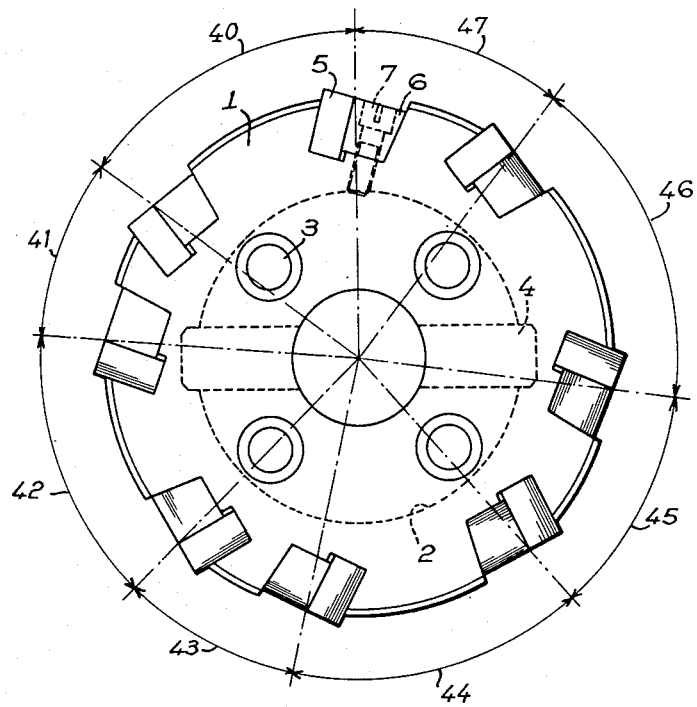
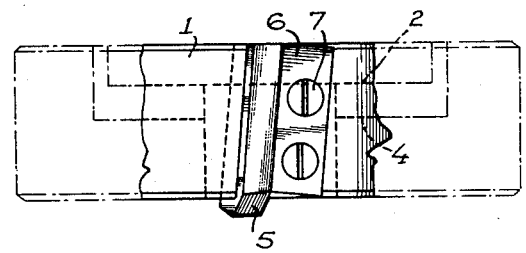
Fig. 4
INVENTOR
MICHEL CAREJE
BY
Corey, Hart + Stemple
ATTORNEYS United States Patent Office 3,203,072
Patented Aug. 31, 1965

3,203,072
MILLING CUTTERS
Michel Careje, Lille, France, assignor to Societe dite: Derefa Etablissement pour Le Developpement, Recherches et Fabrications Industrielles, Vaduz, Liechtenstein
Filed Jan. 29, 1965, Ser. No. 430,246
Claims priority, application France, May 11, 1962, 897,210
5 Claims. (Cl. 29—105)

This application is a continuation-in-part of my application Serial No. 246,695 filed December 24, 1962, now abandoned.

In the field of mechanical construction, parts of large dimensions are these days being shaped more and more by milling, using milling cutters having blades fitted thereto which are made from tungsten carbide, or, more recently, from ceramic material.

Milling operations are particularly suitable for large quantity production and for precision surfaces requiring a high quality finish.

The chief disadvantage of milling is that, because of the relative fragility of the materials of which the blades are made, they have to be reground fairly frequently, all the more because the milling cutter does not work in the best possible conditions, i.e. inter alia, on parts which are very rigid and do not vibrate, or only vibrate very little, under the operation of the milling cutter.

These vibrations are not always perceptible and only rarely lead to the extreme phenomenon of resonance, called chattering; nevertheless, they exist, to a greater or lesser extent, on most parts having large dimensions and as a result are liable to impair the working life of the milling cutter and the degree of finish of the surface which can be achieved.

Milling cutters of conventional type have a certain numbed of blades often distributed evenly over the periphery of the base or body of the cutter. This arrangement causes a discontinuous or periodic cutting action depending on the number of working blades, and the frequency of this periodicity has a certain mathematical value. If this frequency, which is known as the maintenance of excitement frequency, synchronises with the natural frequency of the workpiece, there results a marked increase of the vibration of the whole, which may lead to chattering of the milling cutter and may not permit the desired working quality to be achieved. The blades are worn out very rapidly and may sometimes break.

Milling cutters with blades irregularly spaced are also manufactured, but their arrangement does not make it posible to obtain spacing variations having a period of one cycle per revolution of the cutter, nor to avoid a successive repetition of two equal angles, nor to avoid the production of harmonics of higher order which are likely to bring about results similar to those due to a successive repetition of equal angles.

An object of the present invention is to reduce and even to obviate this disadvantage, by using a milling cutter whose blades are spaced irregularly round the periphery of the body thereof according to a predetermined law, so as to avoid the usual result with conventional milling cutters, i.e. an excitement frequency within the range of the natural frequencies of workpieces of large dimensions, 30 to 120 cycles per second, and, as a result, to avoid the risk of synchronism, and thus of chattering.

In a first embodiment of a milling cutter to which the invention relates, the blades are staggered irregularly round the periphery of the body in accordance with a sinusoidal law identical to the first two terms of a Fourier series whose constants are a function of various case-types of working and of worked parts.

The variation of the angular interval, and thus of the frequency of the blades, results in a variation of the thickness of the chips and thus of the torque applied to the machine spindle, and, as a result, the period of the excitement vibration, which, in a conventional milling cutter is equal to the product of the number of blades and the number of revolutions per second, becomes equal to a product found by reducing the number of revolutions per second to one, which reduces the risk of resonance.

Further, the sinusoidally angular variation of the blades prevents the introduction of harmonics of an order which is greater than 1, and which would tend to resonate with the harmonics of a composite vibration developing in the part and in the plane of the milling cutter.

This milling cutter also enables work of high quality to be achieved although it may be mounted on a machine whose kinematic spindle driving arrangement does not have all the desired qualities, whether as a result of its size, or of its condition as a result of wear, due to lack of maintenance of torsional vibrations in the mechanical and electrical parts constituting it, such as shafts, gears, motors, etc.

In a second embodiment, and for other uses, notably on flexible mechanically welded parts, the milling cutter is not formed so that the excitement frequency is reduced to the value of the spindle rotation frequency, but has an arrangement of blades which, while conserving the sinusoidal variation has the property that the vibration created by any one blade is totally or partially destroyed by the next succeeding blade. To achieve this, the successive spacings between the blades are in the ratio 1:1.5, so as to create an out of phase condition of the order of 180° between the vibrations of two consecutive blades, forward or back.

It will be understood from the foregoing, that a milling cutter embodying the present invention is provided with a plurality of cutter teeth which are spaced apart at distances which vary progressively in accordance with at least one given, complete sinusoidal curve representative of a single cycle of revolution of the cutter so that successive distances between at least one series of cutting teeth thereof initially increase progressively from a given distance associated with a tooth having a center angle of a value approximately equal to 360° divided by the number of cutting teeth, to a maximum, then decrease progressively from such maximum to a minimum below the given difference, and then increase progressively from such minimum back to said given distance so that in the complete circumference of the milling cutter there are included at least one maximum distance and one minimum distance, above and below, respectively, said given distance. In such a construction all of the teeth in the cutter will be diametrically offset from one another. As has been above indicated, the spacing of the teeth may be determined by the use of a single sinusoidal curve, or may be determined from the use of more than one curve employed so as to create an out of phase condition between the vibrations of two consecutive blades, but in either case the sinusoidal vibration is identical in principle. It will be hereinafter disclosed how the angles of the blades in both embodiments may be determined graphically.

For a better understanding of the invention reference is made to the accompanying drawings which show two embodiments thereof for the purpose of example only, and in which:

FIGURE 1 shows an elevation of a first embodiment of milling cutter;

FIGURE 2 shows a plan view of the arrangement of FIGURE 1;

FIGURE 4 shows an elevation of a second embodiment of milling cutter;

FIGURE 5 shows a plan view of the arrangement of FIGURE 4; and

Figure 3:
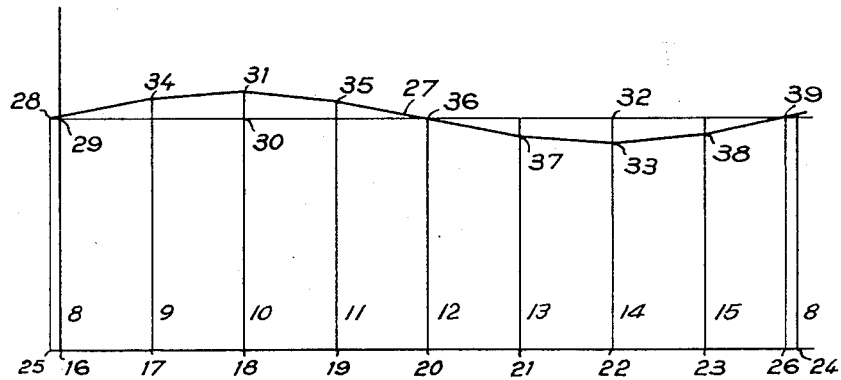
FIGURE 3 is a diagram showing graphically the resolution of the spacing angles of the blades in the cutter of FIGURES 1 and 2.

Referring now to the drawings, the milling cutter shown in FIGURES 1 and 2 comprises a body 1 which is fixed to the spindle of a milling machine by means of a centering slot 2 and four holes 3 for screws with cylindrical heads, the drive being ensured by two pins on the machine spindle, (not shown in the drawing), engaging in corresponding recesses 4. Eight blades 5 are fixed to the body 1 by means of small sloping blocks 6 and screws 7 with cylindrical heads. The indicated eight center angles 8 to 15 between the blades are successively unequal and vary sinusoidally.

FIGURE 3 is a graphic diagram of the angular relation of the blades, the variations in such relation conforming to the form of a sinusoidal curve 27. In the graph of FIGURE 3, the distances between the points 16–17, 17–18, etc. are equal, and the total distance between the points 16–24 represents both one 360° circle of revolution of the milling cutter and the 360° periodic representation of the sinusoidal curve 27. These points on the abscissa of FIGURE 3, which serve to determine the values along the ordinate of the angle $\beta$, are determined by the expression $$\frac{2\pi}{n}$$

wherein $2\pi$ is the period and $n$ represents the number of teeth in the cutter. Accordingly, as can be observed by a comparison of FIGURES 2 and 3 of the drawings, the distance between the points 16–24 represents the sum of the center angles 8 to 15 in FIG. 2, i.e., 360° or one revolution of the cutter and therefore the one single and complete sinusoidal curve which extends over such distance in accordance with the invention also represents one cycle of revolution of the cutter.

The distances 16–17, 16–18, etc. are proportional to an angle $\theta$ relating to each blade i.e. to the angle enclosed by an original radius and the imaginary radius passing through a blade supposed to be angularly equidistant from neighboring blades, the angle $\theta$ at 16, thus being equal to 0.

The distance 16–25, which is equal to the distance 24–26, corresponds to a small angle $\theta_0$ which is used in milling cutters having an even number of blades (as in the example shown in FIGURE 2) in order to avoid some of the spacing angles between the blades of the cutter being equal, which would be the case, for instance, with spacing angles 9 and 11, and 8 and 12, without the provision of the initial offset distance 16–25. In other words, the purpose of the offset $\theta_0$ is to prevent the existence of two equal angles $\varphi$ symmetrically situated with respect to the axes $$\theta = \frac{\pi}{2} \text{ and } \theta = \frac{3\pi}{2}$$

$\theta_0$ should have a value between 0 and $$\theta = \frac{360}{n}$$

or $$0 < \theta_0 < \frac{360}{n}$$

In practice, $\theta_0$ will have a value of 0.1 to 0.2 times $$\frac{360}{n}$$

This small angle does not need to be used in milling cutters having an odd number of blades, as the aforementioned disadvantage cannot arise; and in this case, the origin of the sinusoidal curve 27 is not at the point 28, but at the point 29.

The distance 25–28 represents a length $\varphi$ 0 proportional or analogous to the centre angle of a milling cutter whose teeth are evenly distributed, this centre angle having a value equal to 360° divided by the number of blades. The equal distances 30–31 and 32–33 represent approximately half of the amplitude of the sinusoidal curve 27. They are set up as a function of the variation of the thickness of the turnings allowed on the milling cutter. Taking all this into account, the sinusoidal curve 27 is represented by the function $$\varphi = \varphi_0 + \alpha \sin(\theta + \theta_0)$$

in which the value of $\beta_0$ is the average value of the angle $\beta$ and may be defined by the equation $$\frac{\epsilon \beta}{n} = \frac{360}{n}$$

where $n$ is the number of cutter teeth. $\theta_0$, therefore is equal to the angle existing between any successive pair of teeth of a cutter having regularly spaced teeth and having the same number of teeth as the cutter disclosed herein. Thus, the distance 25–28 represents or is analogous to the angle to the centre of a cutter having its teeth spaced at regular intervals. With respect to the cutter of FIGURE 2 of the drawings, the values of $\varphi$, or the lengths which are representative of the successive angular positions of the blades, such angles being the unequal angles indicated in FIGURE 2 by the numbers 8 to 15, are represented by the distances 16–29, 17–34, 18–31, 19–35, 20–36, 21–37, 22–33, 23–38 in FIGURE 3.

In another embodiment which is shown in FIGURES 4 and 5, another means of angular sinusoidal spacing is used, with unequal center angles indicated in the said FIGURE 5, by the references 40–47. On examination of this figure, it will be seen that consecutive angles for example 40 and 41, are very different, these particular ones being in the ratio 1.5 to 1.

Figure 6:
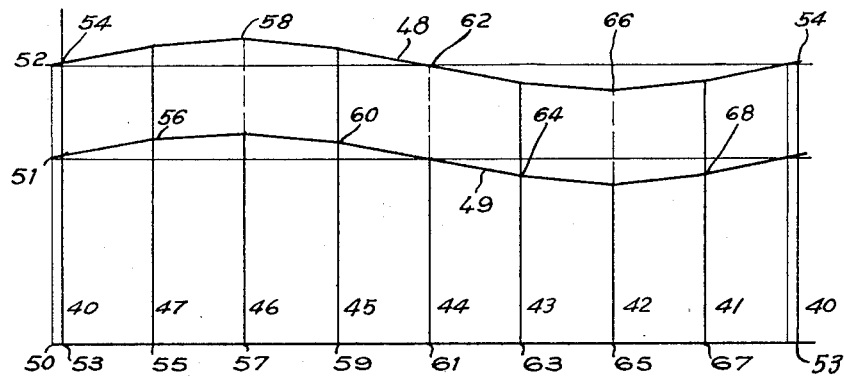
FIGURE 6 is a diagram showing graphically the resolution of the spacing angles of the blades in the cutter of FIGURES 4 and 5.

FIGURE 6 is similar to FIGURE 3, but relates to the embodiment shown in FIGURES 4 and 5.

All the preceding notations and definitions have been conserved, but, in this case, it is as well to consider separately even blades and odd blades.

Since the sinusoidal curve 48 corresponds to odd blades and is represented by the function:

$$\varphi = 1.5\varphi 0 + \alpha \sin(\theta + \theta_0)$$

and the sinusoidal curve 49 corresponds to even blades $$\varphi = \varphi\ 0 + \alpha \sin(\sin(\theta + \theta_0))$$

it follows that the values having 50–51 and 50–52 as origins are in the ratio 1:1.5 in the case under consideration. As previously pointed out, the value of 1.5 is selected in order that, in case of resonance, a following tooth will always set up vibrations opposite those set up by a preceding tooth. In other words, as the stress introduced by a tooth is substantially in synchronism with the vibration induced thereby, the offsetting of the following tooth by a distance equal to 50% on a time scale will cause the stress on the latter to be in phase opposition with the vibration generated in the preceding tooth. The values of $\varphi$ (length proportional to the successive positioning angles of the blades) are represented by the distances 53–54, 55–56, 57–58, 59–60, 61–62, 63–64, 65–66, 67–68.

It will be appreciated that the milling cutters which have been described in the two aforesaid embodiments may have a different number of blades from that which has been shown, without departing from the spirit of the invention or the scope of the appended claims, and that the foregoing employment of the terms of a "Fourier Series" in illustrating how the blades may be disposed in accordance with the invention, was by way of example only and should not be considered in a limiting sense. The number $n$ of teeth in an actual situation is determined by the existing construction capabilities. On the perimeter of the cutters there must exist an extent which is sufficient to contain the required number of teeth, the attaching means for the teeth, and a body portion sufficient to support the cutting stresses and to transmit to the driving spindle. The cross-section of the teeth will vary with the cross-section of the chip which it is desired to remove during the cutting operation. The desired chip cross-section itself depends on the type of cutting material utilized. The minimum center angle between two teeth is determined by the value $(\varphi_0-\alpha)$ after having chosen a limiting value of $$\beta_0 = \frac{360}{n}$$

which depends on the cutter diameter. It should be checked to determine whether the angle determined by the value $(\beta_0-\alpha)$ permits the proper placement of the required teeth and their fastening means and that the stress transmitting portion of the cutter body is sufficient to ensure a satisfactory operation. In general, $\alpha$ is made slightly greater than $$\frac{\beta_0}{10}$$

(example: for $\beta_0=45°$, $\alpha$ is made equal to 5°, so that $(\beta_0-\alpha)=40°$).

Moreover, as has been previously explained the periodic function chosen should be one that does not have any harmonics of an order greater than 1. This is of importance in preventing the generation of self-induced vibrations in modern machines which are equipped with kinematic chains which are shorter and have broader dimensions than machines of older construction, and, even where a cutter having regularly spaced teeth is employed in order to obtain a good result on a rigid piece. In order to overcome this type of vibration, it has been found that an offsetting of some type will be necessary since it is a matter of preventing the existence of a synchronism between the cutter teeth and the grooves and ridges which have been formed thereby. It is known that, depending on whether the milling is carried out with a tool made of high-speed steel, carbide, or ceramic, the cutting speed will vary over a range of 20-to-1, or effectively from 20 meters/min. to 400 meters/min. Moreover, there exists a great difference between a workpiece having a natural frequency of 20 c.p.s. and one having a natural frequency of 400 c.p.s. The first piece being very flexible and the second being very rigid, the law of sinusoidal variation in which no angle repeats itself tends to lead the excitation frequencies to the value of $f=n \times N$; $n$ being the number of cutter teeth and N being the number of cutter revolutions per second. This result serves to prevent, in most cases, the production of a resonance between the natural frequency of the workpiece and the excitation frequency generated by the cutter, the resulting vibration in this case being a forced vibration. As the instantaneous torque which is applied to the cutter is rigorously proportional to the angles, the variable stresses are applied periodically, the variation of these efforts being itself sinusoidal and thus incapable of introducing higher order harmonics, which might cause the cutter to behave as if it had a plurality of regularly spaced teeth.

If the excitation frequency can not be sufficiently decreased by the aforesaid procedure, one may, as has been previously indicated, use the embodiment of the invention employing a "double sinusoid" in which every other angle between adjacent teeth is followed by an angle whose value is 1.5 times that of the preceding angle. The position in which position said one end of said plunger than varies in the rate of 1/1.5. Consequently, the amplitudes of the vibrations following the excitation frequency, with a certain dephasing, will always be substantially in phase opposition from one tooth to the next and there will thus be a resulting automatic suppression of the vibrations.

In fact, as has been previously stated, when there is resonance or when a normal cutter is operating close to resonance, the vibration of the piece or the vibration of the kinematic chain will be in phase, or nearly in phase, with the stress producing this vibration, as for example, when a tooth is entering the workpiece. The frequency is then common to both and equals $N \times n$, where N is the number of rev./sec. of the cutter and $n$ is the number of cutter teeth. The amplitude of the vibration of the workpiece increases and tends, theoretically, toward infinity, but the frequency remains equal to $N \times n$. The period, or the inverse of the frequency, is a "time" and is equal to the time between the entry of two successive teeth into the work and is constant for a cutter having uniformly distributed blades. If this period is increased by 50% after the passage of one tooth has generated a vibration, the following tooth will enter the work when the latter is at a point in its vibration, which is 180° out of phase from the beginning of the vibration, or at a low point if one assumes that the preceding blade entered when the work was at a high point. Thus, the goal is to dephase the cause of the vibration, which cause is constituted by the periodic stress created by the penetration of the workpiece by a tooth, with respect to the amplitude of this penetration.

The above reasoning holds true for resonance, which it is desired to avoid. In fact, a self-damping results over a large frequency range since the oscillator, i.e. the cutter, produces a variable period and each tooth generates a frequency which is 180° out of phase with that produced by the preceding tooth. This technique is used primarily on workpieces having low resonant frequencies of 10 to 50 c.p.s.

It should be pointed out, that while previously indication was given that the value of the angle between two successive teeth of the milling cutter should be determined according to the following sinusoidal law $$\beta = \beta_0 + \alpha \sin(\theta + \theta_0)$$

it might be clearer to indicate the value of the increment $e$ (positive or negative) itself with respect to the basic tooth spacing, but of course according to the same sinusoidal law, namely $e = \alpha \sin(\theta + \theta_0)$ in which $\alpha$ is a constant, namely, the maximum amplitude of the sinusoidal curve admissible for the duty of the milling cutter, $\theta_0$ is a constant small angle adapted to prevent the increment $e$ from taking the same value twice in succession, and $\theta$ is equal to $$K \times \frac{360°}{n}$$

in which $n$ is the number of teeth of the cutter and K is the number which defines the order of the successive teeth and which, therefore, varies from 1 to $n$.

The aforesaid formula will hold true for both the embodiment of FIGURE 2 (curve of FIGURE 3) in which the basic tooth spacing is uniform (equi-angle) whatever the number (either even or odd) of teeth of the cutter, and for the embodiment of FIGURE 5 (curve of FIGURE 6) in which is provided an even number of teeth and in which the basic tooth spacing consists of alternately a relatively large angle followed by a relatively small angle. In the first embodiment, the basic spacing will be the distance (25–28) on the curve of FIG. 3, namely $$\varphi = \frac{360°}{n}$$

(in which $n$ is the number of teeth of the cutter). In the second embodiment, the basic spacing will be composed of the combination of the succession of a relatively small angle $$\beta_1 = \frac{4}{5}\beta_0 = \frac{4}{5} \times \frac{360°}{n}$$

represented by the distance (50–51) on the curve of FIG. 6, and a relatively large angle $$\beta_2 = \frac{6}{5}\beta_0 + \frac{6}{5} \times \frac{360°}{n}$$

represented by the distance (50–52) on the same curve. In any case, the successive increments to be taken into consideration for slightly shifting (lead or lag) angularly the successive teeth with respect to their basic angular position, can be found by the aforesaid increment formula.

Milling cutters made in accordance with the invention have anti-vibrating qualities proved by the reduced wear of the blades used therein, and by the achievement of surfaces having a finish of a higher quality than those achieved by cutters of conventional type, and, in particular, on non-rigid parts.

What is claimed is:

1. A milling-cutter having a plurality of cutting teeth, the successive interdental peripheral spacings of which, are successively increased and decreased relative to the basic spacing by an amount $e$ which is determined by the following sinusoidal law $$e = \alpha \sin(\theta + \theta_0)$$

in which:

$\alpha$ is a constant, namely, the maximum amplitude of the sinusoidal curve admissible for the duty of the milling cutter, $\theta_0$ is a constant small angle adapted to prevent the increment $e$ from taking the same value twice in succession $\theta$ is equal to $$K \times \frac{360°}{n}$$

in which $n$ is the number of teeth of the cutter and $K$ is the number which defines the order of the successive teeth and which, therefore, varies from 1 to $n$.

2. A milling cutter comprising a body and a plurality of cutting teeth provided on said body, all of said teeth being diametrically offset from one another and said teeth being spaced apart at distances which vary progressively in accordance with at least one given, complete sinusoidal curve representative of a single cycle of revolution of the cutter so that successive distances between at least one series of cutting teeth thereof initially increase progressively from a given distance associated with a tooth having a center angle of a value approximately equal to 360° divided by the number of cutting teeth, to a maximum, then decrease progressively from said maximum to a minimum below said given distance, and then increase progressively from said minimum back to said given distance so that in the complete circumference of the milling cutter there are included at least one maximum distance and one minimum distance, above and below, respectively, said given distance.

3. A milling cutter having a plurality of cutting teeth, the successive interdental peripheral spacings of which are successively increased and decreased by given increments from a given distance assocated with a tooth having a center angle of a value approximately equal to 360° divided by the number of cutting teeth in accordance with at least one given complete sinusoidal curve representative of a single cycle of revolution of the cutter and determined by the following sinusoidal law $$\varphi = \varphi_0 + \alpha \sin(\theta + \theta_0)$$

in which $\varphi$ represents said given distance plus or minus the increment by which it is increased or decreased, respectively, $\varphi_0$ represents said given distance, $\alpha$ is a constant, namely, the maximum amplitude of the sinusoidal curve admissible for the duty of the milling cutter, $\theta_0$ is a constant small angle adapted to prevent the increment from having the same value twice in succession, and $\theta$ is equal to $$K \times \frac{360°}{n}$$

wherein $n$ is the number of teeth of the cutter and $K$ is the number which defines the order of the successive teeth and which, therefore, varies from 1 to $n$, whereby in one complete cycle of revolution of the cutter successive distances between at least one series of cutting teeth thereof initially increase progressively from said given distance to a maximum, then decrease progressively from said maximum to a minimum below said given distance, and then increase progressively from said minimum back to said given distance so that in the complete circumference of the milling cutter there are included at least one maximum distance and one minimum distance, above and below, respectively, said given distance.

4. A milling cutter such as defined in claim 1 in which said cutter is provided with an even number of teeth which are so spaced apart that the basic distance between each even numbered tooth and the next succeeding odd numbered tooth is different from the basic distance between each odd numbered tooth and the next succeeding even numbered tooth, as considered in the same rotational direction about the axis of the milling cutter.

5. A milling cutter such as defined in claim 4, in which the lengths of any two successive distances between the teeth are substantially in the ratio of 1:1.5.

No references cited.

WILLIAM W. DYER, JR., *Primary Examiner.*

UNITED STATES PATENT OFFICE
CERTIFICATE OF CORRECTION

Patent No. 3,203,072 August 31, 1965

Michel Careje

It is hereby certified that error appears in the above numbered patent requiring correction and that the said Letters Patent should read as corrected below.

Column 4, line 52, after "blades" insert -- represented by the function --; column 5, line 75, for "position in which position said one end of said plunger" read -- frequency of the passage of the teeth past the workpiece --; column 6, line 1, for "than" read -- then --; column 7, line 35, for "suc-" read -- succession, and --.

Signed and sealed this 14th day of June 1966.

EAL)

test:

ıNEST W. SWIDER testing Officer

EDWARD J. BRENNER

Commissioner of Patents